United States Patent [19]
Yamaguchi et al.

[11] Patent Number: 5,180,554
[45] Date of Patent: Jan. 19, 1993

[54] METHOD OF DETECTING THE PRESENCE OF MOISTURE IN A GAS

[75] Inventors: Toru Yamaguchi, Sakura; Yukio Inazuki, Sayama; Hideo Nakazawa, Funabashi, all of Japan

[73] Assignee: Ishikawajima-Harima Heavy Industries Co., Ltd., Tokyo, Japan

[21] Appl. No.: 737,121

[22] Filed: Jul. 29, 1991

Related U.S. Application Data

[62] Division of Ser. No. 384,232, Jul. 24, 1989, abandoned.

[30] Foreign Application Priority Data

Jul. 25, 1988 [JP] Japan .................. 63-183672
Aug. 2, 1988 [JP] Japan .................. 63-192037
Aug. 2, 1988 [JP] Japan .................. 63-192038

[51] Int. Cl.$^5$ .............................. G01J 1/48
[52] U.S. Cl. ........................ 422/86; 422/88; 436/2; 436/39; 252/181.4; 252/181.7; 423/210
[58] Field of Search ............ 422/122, 86, 88; 436/39, 2; 252/181.4, 181.6, 181.7, 194; 55/418, 359, 422; 210/94, 95; 423/210

[56] References Cited

U.S. PATENT DOCUMENTS

| | | | |
|---|---|---|---|
| 2,163,901 | 6/1939 | Walker et al. | 252/194 |
| 3,033,655 | 12/1960 | Grosskopf | 422/88 |
| 3,246,758 | 4/1966 | Wagner | 210/94 |
| 3,933,431 | 1/1976 | Trujillo et al. | 422/88 |
| 4,758,521 | 7/1988 | Lushbaugh et al. | 422/88 |
| 4,946,649 | 8/1990 | Pannwitz | 422/88 |
| 5,004,585 | 4/1991 | Bommer | 422/88 |

OTHER PUBLICATIONS

Patent Abstracts of Japan, vol. 1, No. 45, 4 (May 1977) and Japanese Patent Publication 51151694 (Nov. 27, 1976).
Patent Abstracts of Japan, vol. 11, No. 300 (Sep. 29, 1987), and Japanese Publication 6295116 (May 1, 1987).
French Patent Publication 2340765 (Sep. 9, 1977).
Kirk-Othmer, *Encyclopedia of Chemical Technology*, 3rd edition, vol. 3, pp. 459, 461, 462 (1979).
Georg Bauer, *Handbook of Preparative Inorganic Chemistry*, 2nd edition, vol. 1, pp. 928-929 (1963).
J. W. Mellor, *A Compreshensive Treatise on Inorganic and Theoretical Chemistry*, vol. 3, pp. 637, 638, 646 (1949).

Primary Examiner—Lynn M. Kummert
Assistant Examiner—Laura E. Collins
Attorney, Agent, or Firm—Dykema Gossett

[57] ABSTRACT

A method of cleaning atmosphere gas used in manufacturing high-purity fine particles of reactive metals comprises the steps of: letting the moisture existing in the atmosphere gas condense into dew droplets using a cryogenic cooling medium; removing the moisture defined by the dew droplets through dissociation by letting it react with metallic Na that has been brought into contact with the dew droplets; generating a vapor of metallic Na in the atmosphere gas so as to remove the moisture still persisting in the atmosphere gas; further removing through dissociation the moisture still persisting in the atmosphere gas by letting it react with Na vapor that has been generated and dispersed into the atmosphere gas; letting the atmosphere gas cleaned of moisture come into contact with black barium powder; and detecting the presence of moisture in the atmosphere gas through a change in color of the black barium powder. The apparatus for practicing the method comprises two devices: one is a Na vapor generator and the other is a tract amount moisture detector.

3 Claims, 3 Drawing Sheets

METHOD OF DETECTING THE PRESENCE OF MOISTURE IN A GAS

This is a divisional of copending application(s) Ser. No. 07/384,232 filed on Jul. 24, 1989 now abandoned.

BACKGROUND OF THE INVENTION

1. Technical Field

The present invention generally relates to a method and apparatus for cleaning atmosphere gas adapted to make high-purity fine particles of reactive metals. More particularly, it relates to a method of removing moisture remaining in the atmosphere gas in a trace amount to an extremely low content level in manufacturing high-purity fine particles of reactive metals, the metals being reactive especially in terms of liability to forming hydroxides (the "reactive metals," e.g., metal of IIa, IIIa, IVa and IVb families in the periodical table), as well as to an apparatus for generating Na vapor to be used in the gas cleaning step and to a method and apparatus for detecting a trace amount of moisture thereafter.

2. Background Art

In treating reactive metals generally, the practice of providing an inert or vacuum environment to which the metals are exposed is known in the art.

In connection with treating reactive metals, there is presently a strong need for manufacturing high-purity fine particles, especially those which are apt to form hydroxides (e.g., the IIa, IIIa, IVa and IV b family metals in the periodical table, hereinafter referred to as "reactive metals") from a sector of advanced material such as superconducting materials. Here, one technical problem is that an ordinary inert gas atmosphere or vacuum is not good enough for the reactive metals, because they form hydroxides upon reaction with moisture remaining in the environment gas even if the moisture exists in a small amount and the hydroxides give rise to voids or other defects in the product particles, thereby degrading the qualities thereof.

For removing moisture from the atmosphere gas so as to prevent the above defects, the presently common practice is either to use a moisture absorbent such as silica gel, sulfuric acid, sodium hydroxide or anhydrous magnesium perchlorate, or to use a dehumidifying machine of one sort or another. However, these methods are not completely capable of removing the moisture to an extremely low content level (e.g., 10-100 Weight-/Volume part per billion (W/V ppb)) that satisfies us in making high-purity fine particles of reactive metals.

With the methods using a moisture absorbent moreover, there is a problem of the absorbent releasing the moisture it has captured once, if the atmospheric temperature rises or the pressure drops.

Even if such a low moisture content has been attained, furthermore, there exists no method today to easily and qualitatively detect moisture present in such trace amount. That is to say, today's general practice is to sample out the atmosphere gas and determine the moisture content by letting the absorber (usually calcium chloride) absorb its moisture away and knowing the absorber's weight difference, i.e., the so-called absorbed mass method; but this method is in applicable to certain usages because of sheer lack of sensitivity.

Furthermore, this method is inapplicable where manufacturing of the reactive metals is always conducted in a small-size hermetically enclosed vessel, and the absorbed mass method cannot be practices in such a confined space.

SUMMARY OF THE INVENTION

One of the purposes of the present invention is to provide a method of removing moisture from an inert gas atmosphere prepared for manufacturing high-purity fine particles of reactive metals, the metals being reactive especially in terms of liability to forming hydroxides (e.g., metals of the IIa, IIIa, IVa and IVb families in the periodical table, i.e., 10-100 W/V ppb), namely a method of cleaning such atmosphere gas (called the "atmosphere gas cleaning method" hereafter) and an apparatus for generating sodium vapor (the "Na vapor generator") employed therefor.

Another purpose of this invention is to provide a method of detecting the moisture in the atmosphere gas as described earlier in a simply and easy manner (the "trace moisture detection method") and an apparatus therefor (the "trace moisture detector").

In summary, the present invention provides an atmosphere gas cleaning method, a Na vapor generator used therefor, a trace moisture detection method, and the trace moisture detector used therefor.

Moreover, we provide several embodiments to accomplish the above-mentioned purposes.

In a first embodiment, we first let the moisture remaining in the atmosphere gas condense into dew droplets in a manufacturing vessel by cooling the vessel with a cryogenic cooling medium and decompose the dew droplets by bringing the metallic Na into contact with them so as to change them to sodium hydroxide in accordance with the reaction indicated below in order to substantially remove the moisture.

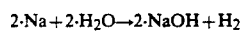

$$2\cdot Na + 2\cdot H_2O \rightarrow 2\cdot NaOH + H_2$$

That is, this process is a form of solid gettering of moisture conducted with metallic Na. Na serves as a solid phase getter.

In a second embodiment, we generate vapor of metallic Na in the atmosphere gas, make it disperse uniformly therein and then decompose the moisture by allowing it to react with Na vapor, thereby transforming it to sodium hydroxide, so as to substantially remove the moisture from the atmosphere gas. This process is then a form of gas phase gettering of moisture conducted with Na vapor. Na vapor serves as a gas phase getter.

In a third variety, first we conduct the solid gettering with metallic Na; namely, we start off by letting the moisture remaining in the atmosphere gas condense into dew droplets in the metal manufacturing vessel by cooling the vessel with a cryogenic cooling medium and decompose the dew droplets by bring metallic Na into contact with them into sodium hydroxide and remove the moisture in the form of a hydroxide group; subsequent thereto, we conduct the gas phase gettering with Na vapor for the moisture still persisting in an uncondensed trace amount in the atmosphere gas; namely, we generate vapor of metallic Na in the atmosphere gas, letting it disperse uniformly, and decompose the remaining hydrogen by letting it react with Na vapor. Thus, this process is a combination of solid phase gettering and gas phase gettering, both using metallic Na, and we have found that moisture can be removed to an extremely low level content (e.g., 10-100 W/V ppb) this way.

In an atmosphere gas thusly cleansed of moisture, manufacturing of high-purity fine particles of the reactive metals can be conducted without feat of incurring purity degradation. Here, the completeness of moisture elimination is in the order of a method of the third variety) the second variety) the first variety.

The Na vapor generator comprises a hermetically sealable vessel to hold and melt metallic Na, a heating device provided covering the vessel so as to heat the metallic Na to melt and further to vaporize it, and a Na vapor outlet nozzle provided at the vessel's free top which can be opened or closed. To generate Na vapor, we place a quantity of metallic Na in the Na vapor generator vessel, close the Na vapor outlet nozzle, cover the vessel with the heating device, let the heating device heat metallic Na to melt and further to vaporize; then we open the Na vapor outlet nozzle to release the Na vapor into the atmosphere gas in order to perform the gas phase gettering. It will be understood that with this apparatus, we are able to generate Na vapor in the atmosphere gas quite simply and safely.

According to the trace moisture detection method, the moisture existing in an atmosphere of an inert gas in a trace amount can be detected by letting the atmosphere gas come in contact with black barium powder since the change of the black barium powder in color, i.e., bleaching thereof, indicates the presence of the moisture. This phenomenon occurs when barium hydroxide, which is white in color, is formed in a chemical reaction.

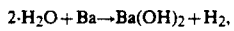

wherein the black barium powders work as a moisture indicator when, and only when, moisture is present in the atmosphere gas.

The apparatus for practicing this method, i.e., the trace moisture detector, comprises a transparent cylinder with black barium powder placed therein, a pair of gas permeable members whose duty is not only to hold the barium powders in the cylinder but also to allow the atmosphere gas to pass therethrough to contact the barium powders, a pair of covers detachably provided at either end of the cylinder, and a seal that hermetically seals each cover and holds it closed so as to protect the black barium powder from moisture in the ambient air while the detector is in disuse.

When the covers are removed in the atmosphere gas concerned, the black barium powder bleaches when, and only when, there is moisture in the gas as described above, even if the amount of the moisture is in trace levels; this color change can be observed reliably and easily form the outside through the transparent cylinder wall of the detector body.

It will be understood that with the trace moisture detector, the black barium powder that acts as the indicator is the only consumable item, all other components bearing up under an indefinite number of repetitive service cycles, and that owing to the hermetic sealing of the cylinder, the trace moisture detector is able to withstand an indefinitely long shelf storage or is free to be transported about in an ambient atmosphere.

DESCRIPTION OF THE PREFERRED EMBODIMENTS

Figure 1:
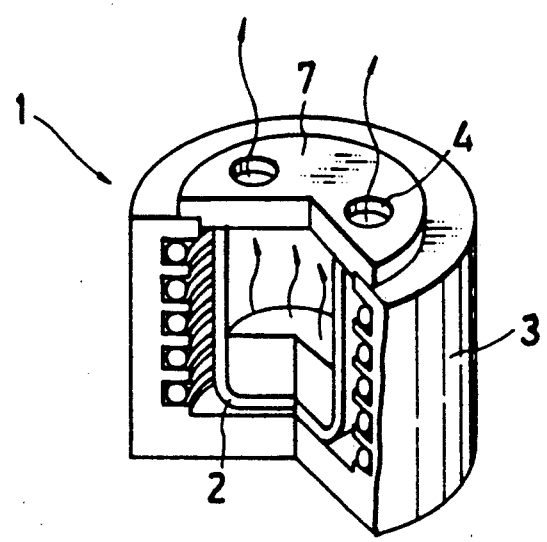
FIG. 1 is a diagram showing a partial cutaway oblique view of one embodiment of the Na vapor generator of the present invention.

In describing the preferred embodiments of the method and apparatus for cleaning atmosphere gas for making high-purity fine particles of reactive metals of this invention, broadly the method of cleaning the atmosphere gas in manufacturing high-purity fine particles of reactive metals comprises a method of removing moisture remaining in the atmosphere gas (called the "moisture removing method" hereafter) and a method of detecting moisture remaining in the atmosphere gas in a trace amount (the "trace moisture detection method"). The apparatus for cleaning atmosphere gas for making high-purity fine particles of reactive metals comprises an apparatus for generating Na vapor (the "Na vapor generator") and an apparatus for detecting moisture remaining in the atmosphere gas in a trace amount (the "trace moisture detector").

Now, to describe and discuss the manners of practicing these methods and apparatus, first we evacuate the vessel for manufacturing the high-purity fine particles of reactive metal, the metals being reactive especially in terms of their inclination or liability to form hydroxides (e.g., the metals of IIa, IIIa, IVa and IVb families of the periodical table; these metals will be called the "reactive metals," and the vessel the "manufacturing vessel" hereafter), then we fill the manufacturing vessel with an inert gas. To remove moisture existing in the manufacturing vessel now filled with the inert gas atmosphere, we bring a cryogenic cooling medium into contact with at least one wall of the vessel. Using liquified nitrogen for the cryogenic cooling medium, we can cool the wall to $-150$ degrees C. or even lower, whereupon the moisture in the atmosphere gas condenses on the wall in the form of dew droplets or more often in the form of ice flakes.

We then remove a rod-shaped lump of metallic Na from a storage bath of oil, such as petroleum, in which it is protected from ignition by the ambient air under the inert atmosphere gas so that it will not ignite, and bring it into contact with the dew droplets thusly formed, whereupon the moisture, now condensed into water ($H_2O$), reacts with the metallic Na in a chemical reaction.

in which reaction the moisture is dissociated and removed in the form of a hydroxide group, and metallic Na serves as the solid getter.

Here, we should emphasize that solid gettering of moisture with metallic Na is most conveniently conducted in a manufacturing vessel and with a cryogenic moisture condenser that we have disclosed in "Vessel for Making High Purity Fine Particles of Reactive Metals," for which we have filed a patent application in Japan (Japanese Patent Application No. 63-218486 filed Sep. 2, 1988), the entire disclosure of which is incorporated herein.

Now, since the solid gettering with metallic Na can apply itself only to condensed moisture, there still persists a certain amount of moisture in the atmosphere gas, though now in a trace amount. To remove this moisture, we use a piece of metallic Na stored in a container filled with inert gas such as argon. Na is then taken out of the container and thereafter placed in the manufacturing vessel and heated therein up to about 600 degrees C. so as to melt and become vaporized. Whereupon, the Na vapor thusly generated disperses, thereby filling up the interior space of the manufacturing space of the manufacturing vessel and reacting with the moisture in the same chemical reaction as described above, thereby forming sodium hydroxide or dissociating the moisture into a hydroxide group so as to substantially remove the moisture by means of the gas phase gettering of moisture by means of the gas phase gettering of moisture with Na vapor. Na vapor now serves as the gas phase getter. In this manner, we are able to remove the moisture to an extremely low content level (e.g., 10–100 W/V ppb).

Here, we wish to emphasize that this gas phase gettering with Na vapor can be conducted most conveniently in the manufacturing vessel mentioned above and with a "Na vapor generator"0 which we will describe shortly.

Having described and discussed the above, it should be appreciated, moreover, that the method of removing moisture form the inert gas atmosphere can be put to general purposes, but that it has been devised especially for cleaning the atmosphere gas for making high-purity fine particles of reactive metals. That is to say, we cite particularly three features for this method: the first is the use of metallic Na, which is the most prone to forming hydroxide among the reactive metals (e.g., metals of IIa, IIIa, IVa and IVb families in the periodical table), as the solid or the gas phase moisture getter; the second is that either one or both of these moisture gettering methods can be practiced in accordance with the content level of moisture remaining in the atmosphere gas; and the third is that, besides its simplicity compared with any of the existing methods, this method is capable of not only attaining an extremely low moisture content level, but also of preventing the release of the captured moisture despite changes in temperature and pressure of the atmosphere gas.

The Na vapor generator used in the gas cleaning method described above will now be disclosed with reference to the attached drawings. As shown in FIG. 1, the Na vapor generator comprises a hermetically sealable vessel 2 to hold metallic Na (this vessel will be called the "Na vessel" hereafter) and a heating device 3 which functions to cover and heat the Na vessel 2 from the outside to melt and further vaporize the metallic Na.

Figure 2:
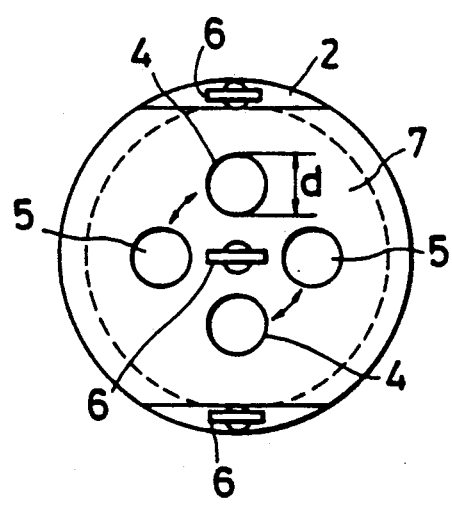
FIG. 2 is a plan view showing a hermetically sealable vessel used in the present invention.
Figure 3:
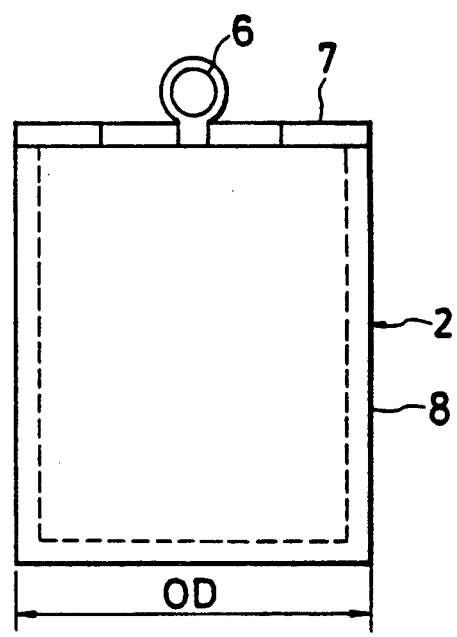
FIG. 3 illustrates a lateral view of FIG. 2.

In one form of construction, the Na vessel 2 is a hollow cylinder as shown in FIGS. 2 and 3; for example, it may be a cylinder 98 mm in outer diameter (OD) and 126 mm in height, made of a 6 mm-thick plate of a ferritic stainless steel. At the top of the Na vessel 2, there are provided a pair of openings 4 spaced form each other along a diameter, having both a diameter d, for example, 20 mm, and there are provided a pair of slidable covers 5 that respectively close openings 4. Moreover, the top of the Na vessel 2 is formed into a removable lid 7 and the rest into a receptor 8, so as to facilitate loading of metallic Na. Finally, at the top of the Na vessel 2, there are provided three eyelets 6, one being provided at the center to hang the lid 7 by an overhead crane (not shown) and the other two being provided at the edge, facing each other along the diameter to hang the receptors 8 by the same crane. Overall, the whole of the Na vessel 2 is so designed as to fit into the heating device 3.

Figure 4:
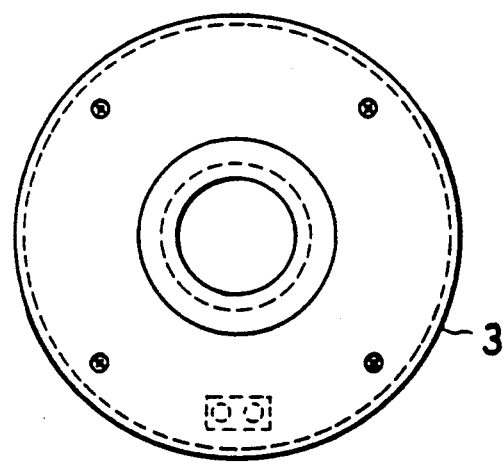
FIG. 4 is a diagram showing a plan view of a heating device used in the present invention.
Figure 5:
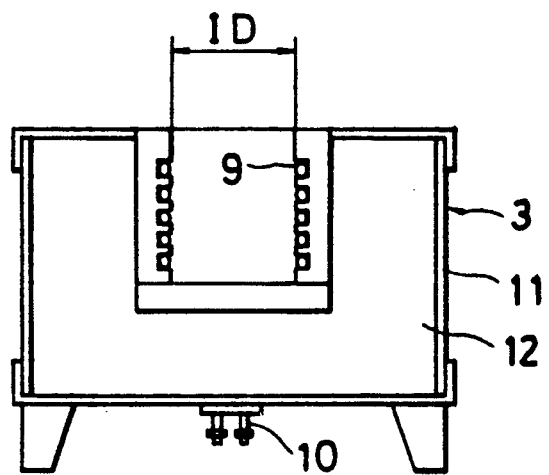
FIG. 5 is a lateral view of FIG. 4.

The heating device 3 can, as shown in FIGS. 4 and 5, be a vertical electric furnace having a fixed bottom. A furnace is employed of the type having a maximum temperature of 1,300 degrees C., e.g., of a type having kanthal wire 9 as the heating element (and equipped with a suitable power source, for example, a variable transformer of a capacity 100V×20A, maximum). In FIG. 5, numeral 10 designates a power connector, 11 a furnace wall, and 12 an insulator. Here, the furnace is of a size, for example, 310 mm in outer diameter, 100 mm in inner diameter (ID), 280 mm in height, and 120 mm in depth, so as to accept the Na vessel 2 with just enough margin in regard to its ID and the Na vessel's OD, and it may be further equipped with a water jacket (not shown).

According to one manner in which we put the Na vapor generator 1 to actual service, we employ the Na vessel 2 for double purpose, one as a metallic Na storage container and the other as a crucible for melting and vaporizing the metallic Na. Namely, when loading lumps of metallic Na into the Na vessel 2, we place them in a bath of oil such as petroleum made there so as to protect them from unintentional ignition. Then we tightly close the Na vessel 2 by putting the lid 7 on and the two openings 4 by closing the slidable covers 5, take the Na vessel 2 into the manufacturing vessel, and fit it into the heating device (electric furnace) 3, which has already been placed in the manufacturing vessel.

We then form an atmosphere of inert gas in the manufacturing vessel and, having confirmed that the atmosphere is inert, we remove the oil from the Na vessel 2 and supply power to the heating device (electric furnace) 3 so as to melt the metallic Na in the vessel 2. When the Na has been sufficiently vaporized, we move the sliding covers 5 to open the nozzles 4, from which we let out the Na vapor jet to be dispersed in the interior of the manufacturing vessel, there to undertake the gas phase gettering, thereby removing the moisture remaining in the atmosphere gas to an extremely low level content (e.g., 10–100 W/V ppb) as described earlier.

Here, the use of the Na vessel 2 for the dual service of storing and then melting the metallic Na can be appreciated as ensuring safety in and simplifying the operation of Na vapor generation. However, other manners of usage are possible, for example, by locating the entire Na vapor generator 1 externally, and by leading a hermetically sealed conduit line from the nozzles 4 into the manufacturing vessel so as to introduce the Na vapor from outside into the atmosphere gas. It should be further noted here that the specification herein of the particular temperature of 600 degrees C. for the maximum heating temperature of metallic Na has been made merely to conform with the use of a ferritic stainless steel as the material of the Na vessel 2.

Figure 6:
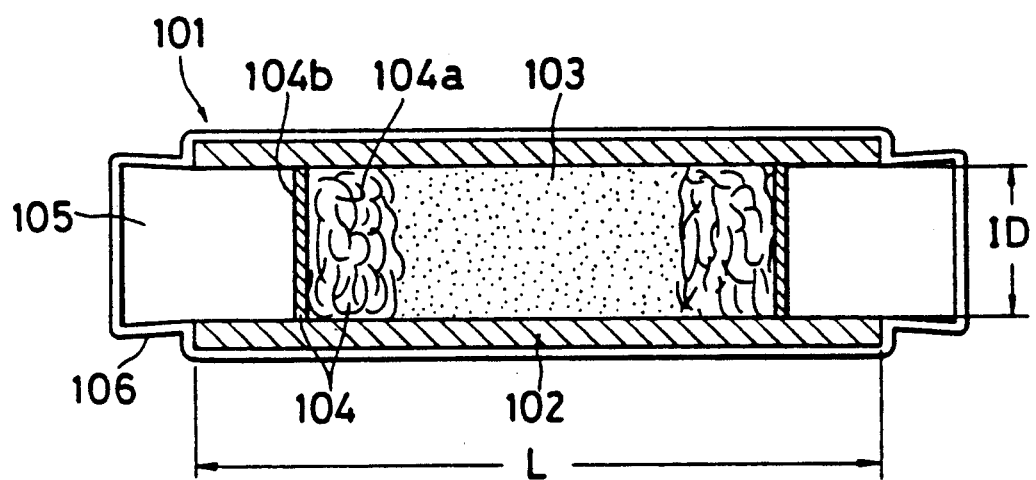
FIG. 6 is a diagram showing a side view of one embodiment of a trace moisture detector of the present invention.
Figure 7:
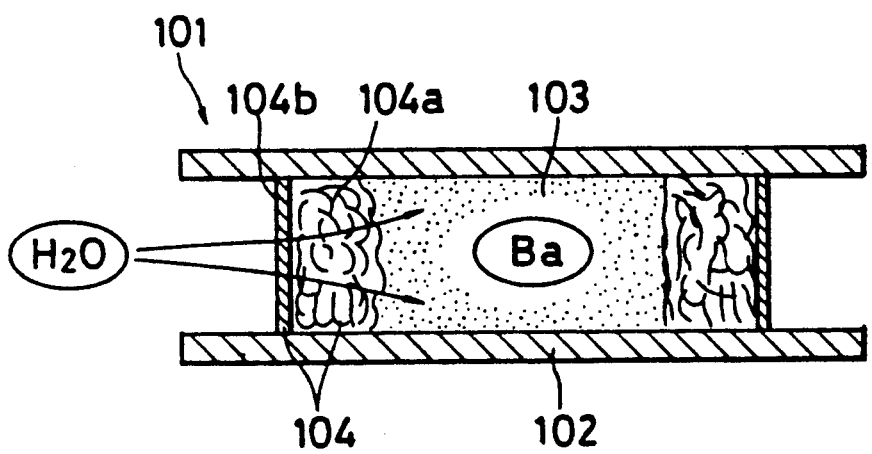
FIG. 7 is a diagram showing the manner of using the trace moisture detector of FIG. 6.

As for the method of examining the result of cleaning the atmosphere gas of moisture achieved by means of the Na generator 1 described above (i.e., the "trace moisture detection method") and the apparatus to be used therefor (i.e., the "trace moisture detector"), firstly, we schematically illustrate the trace moisture detector 101 in FIG. 6. The main body of a trace moisture detector 101 is a transparent cylinder 102 made, for example, of a glass tube 15 mm in inner diameter ID and 50 mm in length L. Within the cylinder 102, there is placed, in an atmosphere properly freed of moisture, an amount of black barium powder (metallic Ba) 103 of a grain size of between 10 and 20 micrometers. Although metallic Ba is colorless, it turns black when it is ground to this size level, because the total reflectivity of visible light is degraded upon pulverization. The detector 101 is preferably manufactured in an atmosphere of low moisture.

The black barium powder 103 is held in position within the cylinder 102 by a pair of gas permeable plugs 104, which function not only to hold the black barium powder in position, but to let the atmosphere gas under examination enter the cylinder 102. Here, we have selected a duplex structure for the plug 104 with glass wool 104a in the inside and a copper mesh 104b at the outside to support the glass wool 104a; the glass wool 104a alone is not strong enough to keep the barium powder in its position, and the copper mesh 104b alone is incapable of holding back the barium powder of such fine grain size.

The ends of the cylinder 102 are closed by plugs 105, the gaps between the plugs 105 and the cylinder 102 being sealed with a sealant 106. The plugs 105 or other means are required when the detector 101 is not used in order to protect the barium powder. Here, a silicone rubber plug is employed as the plug 105. A sol masking resin is employed as the sealant 106 to entirely cover the cylinder 102 together with its two plugs 105 in position for the purpose of making it possible to carry the trace moisture detector 101 around or shelf store it for an indefinitely long period of time.

The manner of practicing the trace moisture detection method using the trace moisture detector 101 will now be described.

First, we place the trace moisture detector 101 (called simply "detector" hereafter) in the manufacturing vessel (not shown), then evacuate the manufacturing vessel, fill it with an inert gas, and remove the moisture in the atmosphere gas a described earlier. It is then that we break the seal 106 and remove the plugs 105, whereupon the atmosphere gas intrudes into the cylinder 102 through the gas permeable members 104 to make contact with the black barium powder 103. When, and only when, the atmosphere gas contains moisture even in a trace amount, the metallic Ba that constitutes the black barium powder 103 reacts with the moisture in a reaction,

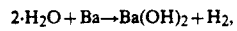

$2 \cdot H_2O + Ba \rightarrow Ba(OH)_2 + H_2,$ producing barium hydroxide, which is white in color, thereby bleaching the black barium powder 103, or letting it work as an indicator of the presence of moisture in the atmosphere gas concerned.

Here, even tough the trace moisture detection method is qualitative in nature, some quasi-quantitative determination of the moisture is yet possible by the degree and rapidity of color change. Therefore, the following criteria is often good enough for the purpose set forth: black (no change in color)=no moisture; stable gray (slight change)=presence of a trace amount of moisture; and white (substantial change)=presence of a considerable amount of moisture. If it is desired that the atmosphere gas be cleaned of moisture to an extremely low content level, the gas cleaning operation described earlier can be repeated.

Having described and discussed the manners of using the trace moisture detector 101, the following features are to be particularly appreciated: first, the sensitivity in detection is very high because Ba gives rise to the clearest visible color change among the alkali metal (Ia family), and alkaline earth metals (IIa family) that are known to be sensitive in reaction with water and bleach themselves by forming white hydroxides; second, the detector 101 can store the black barium powder unchanged in color since the barium is contained in the cylinder 102 which is properly sealed with the plugs 105 and the sealant 106; third, it is small enough to fit in almost any manufacturing vessel; and fourth, the black barium powder suited for the present invention can be obtained in a manner disclosed in Japanese Patent Application No. 63-210620 filed Aug. 26, 1988, entitled "Method of Making High Purity Fine Particles of Reactive Metals," the entire disclosure of which is incorporated herein be reference.

We claim:

1. A method of detecting presence of moisture in a gas, comprising the steps of:
   providing a transparent cylinder;
   placing black barium metal in the cylinder;
   providing gas permeable members at ends of the cylinder; and
   supplying the gas into the cylinder through the gas permeable members such that the gas contacts the barium, whereby the presence of moisture is detected as the black color of the barium bleaches.

2. The method of claim 13, wherein the black barium metal is a powder having a grain size of 10-20 micrometers.

3. The method of claim 1, further including, before placing the black barium metal in the cylinder, the steps of:
   evacuating the cylinder; and
   filling the cylinder with an inert gas.

UNITED STATES PATENT AND TRADEMARK OFFICE
CERTIFICATE OF CORRECTION

PATENT NO. : 5,180,554

DATED : January 19, 1993

INVENTOR(S) : Yamagushi, et al.

It is certified that error appears in the above-identified patent and that said Letters Patent is hereby corrected as shown below:

Column 8, line 47, "13" should read --1--.

Signed and Sealed this

Ninth Day of November, 1993

Attest:

BRUCE LEHMAN

*Attesting Officer*  *Commissioner of Patents and Trademarks*